(12) United States Patent
Usui

(10) Patent No.: US 12,536,570 B2
(45) Date of Patent: Jan. 27, 2026

(54) METHOD AND APPARATUS FOR AN INTERACTIVE COMPLIANT MANUFACTURING PROCESS

(71) Applicant: PROTOLABS, INC., Maple Plain, MN (US)

(72) Inventor: Shuji Usui, Minneapolis, MN (US)

(*) Notice: Subject to any disclaimer, the term of this patent is extended or adjusted under 35 U.S.C. 154(b) by 990 days.

(21) Appl. No.: 17/693,770

(22) Filed: Mar. 14, 2022

(65) Prior Publication Data

US 2023/0289860 A1 Sep. 14, 2023

(51) Int. Cl.

| | |
|---|---|
| G06F 7/48 | (2006.01) |
| G06F 30/12 | (2020.01) |
| G06F 30/17 | (2020.01) |
| G06F 30/27 | (2020.01) |
| G06Q 30/0601 | (2023.01) |
| G06Q 50/04 | (2012.01) |
| G06F 119/18 | (2020.01) |

(52) U.S. Cl.
CPC ......... *G06Q 30/0611* (2013.01); *G06F 30/12* (2020.01); *G06F 30/17* (2020.01); *G06F 30/27* (2020.01); *G06Q 50/04* (2013.01); *G06F 2119/18* (2020.01)

(58) Field of Classification Search
CPC ...... G06F 18/23; G06F 2119/18; G06F 30/12; G06F 30/17; G06F 30/27; G06N 20/00; G06Q 30/0283; G06Q 30/0611; G06Q 50/04; G06T 1/20; G06V 10/762
See application file for complete search history.

(56) References Cited

U.S. PATENT DOCUMENTS

| | | | |
|---|---|---|---|
| 5,586,052 A | 12/1996 | Iannuzzi et al. | |
| 6,223,092 B1 | 4/2001 | Miyakawa et al. | |
| 7,103,434 B2 | 9/2006 | Chernyak et al. | |
| 8,479,089 B2 | 7/2013 | Yuecel et al. | |
| 11,209,345 B1 * | 12/2021 | Madsen | G01N 3/06 |
| 2014/0040850 A1 | 2/2014 | Sawicki et al. | |
| 2020/0183358 A1 | 6/2020 | Wolf et al. | |
| 2021/0124852 A1 | 4/2021 | Cheong et al. | |

(Continued)

OTHER PUBLICATIONS

Edward Morse, Jean-Yves Dantan, Nabil Anwer, Rikard Söderberg, Giovanni Moroni, Ahmed Jawad Qureshi, Xiangqian Jiang, Luc Mathieu, Tolerancing: Managing uncertainty from conceptual design to final product, Jul. 26, 2018.

(Continued)

*Primary Examiner* — Nithya J. Moll
(74) *Attorney, Agent, or Firm* — Caldwell Intellectual Property Law

(57) ABSTRACT

In an aspect, an apparatus for an interactive compliant manufacturing process, wherein the apparatus includes a processor and a memory communicatively connected to the processor. The processor is configured to receive a representative part model from a user and determine a correct interpretation of the model. This includes using a function datum received from a user to minimize correlation ambiguity of the representative part model and verifying the indented interpretation of the representative part model as a function of a specification datum. The processor is further configured to analyze a price quote of the representative part model.

14 Claims, 6 Drawing Sheets

(56) References Cited

U.S. PATENT DOCUMENTS

2021/0200184 A1 7/2021 Pinkston et al.

OTHER PUBLICATIONS

On Uncertainties in Simulations in Engineering Design: A Statistical Tolerance Analysis Application, Michael Walter, Markus Storch and Sandro Wartzack, Apr. 2, 2014.
D. Vetturi, M. Lancini?, I. Bodini and S. Pasinetti, Relationship between measurement uncertainty and verifiability of geometric specifications: the case study of drilled hole orthogonality, Jun. 5, 2013.

* cited by examiner

500

```
┌─────────────────────────────────────────────────────────────┐
│ Receiving, from a User, a Representative Part Model of a Part for │  505
│ Manufacture, wherein the Representative Part Model Includes a Computer │
│           Model of the Part for Manufacture                  │
└─────────────────────────────────────────────────────────────┘
                              │
                              ▼
┌─────────────────────────────────────────────────────────────┐  510
│ Receiving, from a User, a Function Datum to Minimize Correlation │
│       Ambiguity of the Representative Part Model             │
└─────────────────────────────────────────────────────────────┘
                              │
                              ▼
┌─────────────────────────────────────────────────────────────┐  515
│ Verifying, by Processor, the Intended Interpretation of the Representative │
│       Part Model as a Function of a Specification Datum      │
└─────────────────────────────────────────────────────────────┘
                              │
                              ▼
┌─────────────────────────────────────────────────────────────┐  520
│      Analyzing, by Processor, Price Quote of the Representative │
│                          Part Model                          │
└─────────────────────────────────────────────────────────────┘
                              │
                              ▼
┌─────────────────────────────────────────────────────────────┐  525
│  Determining, by Processor, a Measurement Uncertainty Datum as a │
│   Function of the Function Datum and the Specification Datum │
└─────────────────────────────────────────────────────────────┘
```

*FIG. 5*

METHOD AND APPARATUS FOR AN INTERACTIVE COMPLIANT MANUFACTURING PROCESS

FIELD OF THE INVENTION

The present invention generally relates to the field of computer-aided design and structure fabrication. In particular, the present invention is directed to an apparatus and method for an interactive compliant manufacturing process.

BACKGROUND

Computer-aided drawings typically convey information about a to-be-fabricated structure, such as a part or an assembly of components of a part. These parts included in a computer-aided drawing are not designed in view of certain ambiguities and uncertainties. Ambiguities and uncertainties may arise when the mechanical function of the part is not known. Additionally, ambiguities may arise when specifications can be interpreted in several ways. There is a need for a method to guide designer to create parts that are compliant and unambiguous.

SUMMARY OF THE DISCLOSURE

In an aspect an apparatus for an interactive compliant manufacturing process includes a processor; and a memory communicatively connected to the processor, the memory containing instructions configuring the processor to: receive a representative part model of a part for manufacture, wherein the representative part model includes a computer model of the part for manufacture; receive a function datum from a user to minimize correlation ambiguity of the representative part model; verify the intended interpretation of the representative part model as a function of a specification datum; analyze a price quote of the representative part model; and determine a measurement uncertainty datum as a function of the specification datum.

In another aspect a method for an interactive compliant manufacturing process includes receiving, from a user, a representative part model of a part for manufacture, wherein the representative part model includes a computer model of the part for manufacture; receiving, from a user, a function datum to minimize correlation ambiguity of the representative part model; verifying, by processor, the intended interpretation of the representative part model as a function of a specification datum; analyzing, by processor, a price quote of the representative part model; and determining, by processor, a measurement uncertainty datum as a function of the function datum and the specification datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 5 is a process flow diagram illustrating an embodiment of a method for an interactive compliant manufacturing process.

Figure 1:
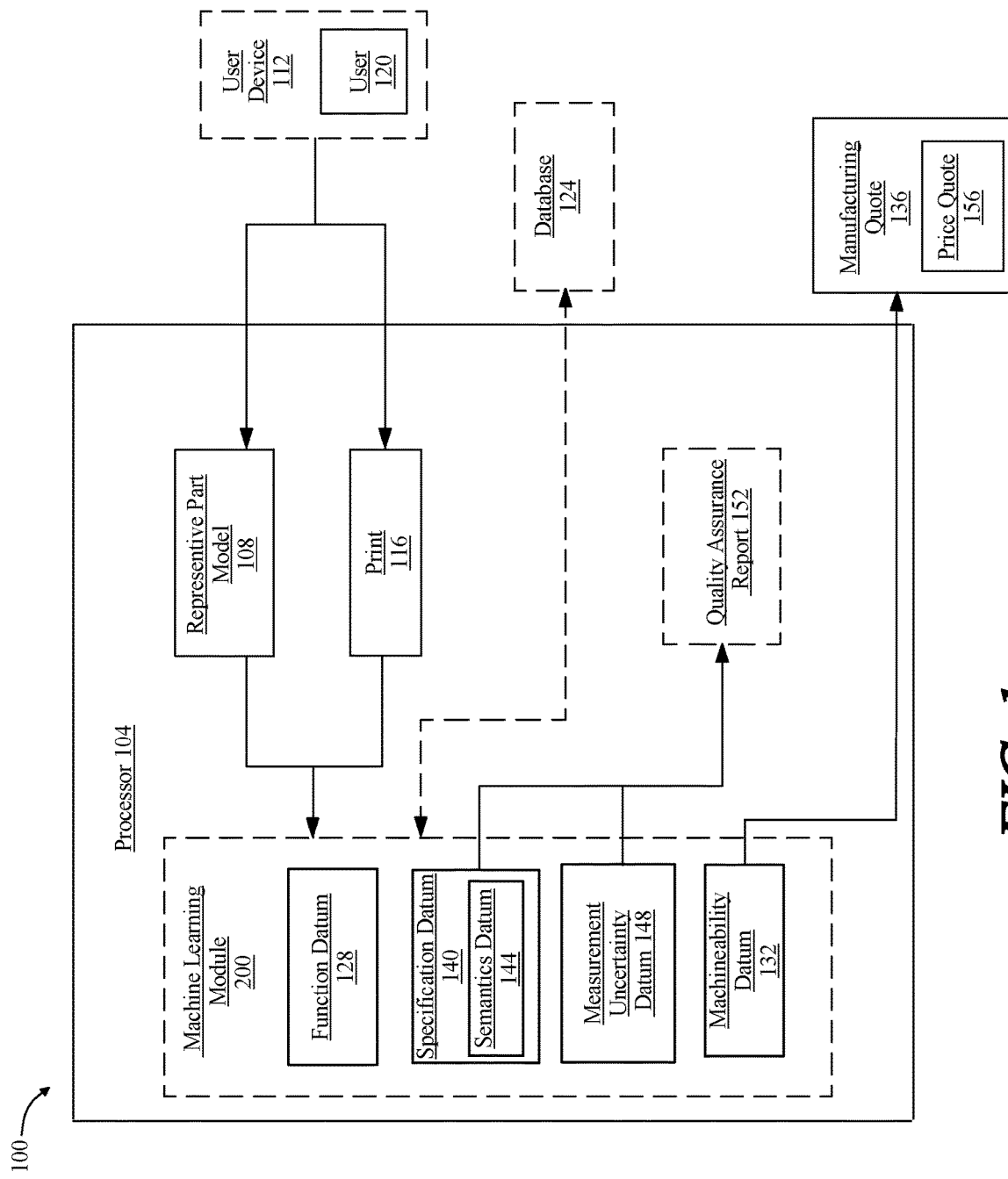
FIG. 1 is a high-level block diagram illustrating an embodiment of an apparatus for an interactive compliant manufacturing process.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and method for a compliant manufacturing process. In an embodiment, the apparatus may comprise a processor. The processor may be configured to receive a representative part model of a part for manufacture. The processor and/or user may be configured to determine a function datum to specify the usage of the representative part model. The processor may also be configured to an extract a semantic datum from the print of the part for manufacture. A specification datum is determined from a function datum and a semantics datum, wherein the specification datum expresses the intent of the semantics datum. A machinability datum is determined as a function of the specification datum. A manufacturing quote is generated as a function of the machinability datum. Aspects of the present disclosure can be used to display a quality assurance report. Aspects of the present disclosure can also be used to determine the manufacturability of a part for manufacture. Exemplary embodiments illustrating aspects of the present disclosure are described below in the context of several specific examples.

Each subtractive manufacturing process used may be any suitable process, such as, but not limited to, rotary-tool milling, drilling, turning, electronic discharge machining, ablation, etching, erosion, cutting, and cleaving, among others. Fundamentally, there is no limitation on the type of subtractive manufacturing process(es) used other than each is compatible with composition of the body of material and/or the fixating material, depending on when a particular subtractive manufacturing process is used in the overall method. For example, differing subtractive manufacturing processes can be used before and after the fixating material has been installed, such that the subtractive machining process used prior to installing the fixating material does not need to be compatible with the fixating material, whereas each subtractive manufacturing process after the fixating material has been installed may need to be compatible with the fixating material, for example, if it is used to remove any of the fixating material, incidentally or intentionally.

If rotary-tool milling is utilized, this milling may be accomplished using any suitable type of milling equipment, such as milling equipment having either a vertically or horizontally oriented spindle shaft. Examples of milling equipment include bed mills, turret mills, C-frame mills, floor mills, gantry mills, knee mills, and ram-type mills, among others. In some embodiments, the milling equipment used for removing material may be of the computerized numerical control (CNC) type that is automated and operates by precisely programmed commands that control movement of one or more parts of the equipment to affect the material removal. CNC machines, their operation, programming, and relation to computer aided manufacturing (CAM) tools and computer aided design (CAD) tools are well known and need not be described in detail herein for those skilled in the art to understand the scope of the present invention and how to practice it in any of its widely varying forms.

Subtractive manufacturing may be performed using spark-erosive devices; for instance, subtractive manufacturing may include removal of material using electronic discharge machining (EDM). EDM may include wire EDM, plunge EDM, immersive EDM, ram EDM, or any other EDM manufacturing technique. Subtractive manufacturing may be performed using laser-cutting processes. Subtractive manufacturing may be performed using water-jet or other fluid-jet cutting techniques. Fundamentally, any process for removal of material may be employed for subtractive manufacturing.

Referring now to FIG. 1, an exemplary embodiment of an apparatus 100 for an interactive compliant manufacturing process is illustrated. System includes a processor 104. processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. processor 104 may include a single computing device operating independently, or may include two or more computing device operating in concert, in parallel, sequentially or the like; two or more computing devices may be included together in a single computing device or in two or more computing devices. processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. processor 104 may include but is not limited to, for example, a computing device or cluster of computing devices in a first location and a second computing device or cluster of computing devices in a second location. processor 104 may include one or more computing devices dedicated to data storage, security, distribution of traffic for load balancing, and the like. processor 104 may distribute one or more computing tasks as described below across a plurality of computing devices of computing device, which may operate in parallel, in series, redundantly, or in any other manner used for distribution of tasks or memory between computing devices. processor 104 may be implemented using a "shared nothing" architecture in which data is cached at the worker, in an embodiment, this may enable scalability of system 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to refer to FIG. 1, apparatus 100 is configured to receive a representative part model 108. Representative part model 108 may be delivered through a user device 112, such as a smartphone, tablet, laptop, or the like. Representative part model 108 further includes a plurality of sides. A "representative part model," as used in this disclosure, is a computer model of a part to be manufactured, wherein manufacturing may include any manufacturing process as described in the entirety of this disclosure. The part may include any item made of materials such as metals including, for example, aluminum and steel alloys, brass, and the like, plastics, such as nylon, acrylic, ABS, Delrin, polycarbonate, and the like, foam, composites, wood, etc. Representative part model 108 may further include any data describing and/or relating to a computer model of a part to be manufactured. A computer model, as described herein, is a digital model of a physical structure as created using computer-aided design (CAD) modeling software. Computer model may include a 3D model that may be created through the use of computer-aided design. For example and without limitation, computer-aided design (CAD) software may include SOLIDWORKS® software and/or CATIA software (available from Dassault Systemes SolidWorks Corp, Waltham, Massachusetts), AUTOCAD® software and/or Fusion 360 software (available from Autodesk, Inc., San Rafael, California), PTC Creo software (available from PTC, Inc., Boston, Massachusetts), Siemens NX software (available from Siemens PLM Software, Plano, Texas) and MICROSTATION® software (available from Bentley Systems, Inc., Exton, Pennsylvania), and the like. The computer model may include any modeling type, such as, without limitation, a wireframe, solid model and/or any combination thereof. The computer model may be saved in a computer file using any suitable file protocol, such as, without limitation, SolidWorks part file (.SLDPRT), several SolidWorks part files organized into a single assembly (.SLDASM), 3D assembly file supported by various mechanical design programs (.STP), graphics file saved in a 2D/3D vector format based on the Initial Graphics Exchange Specification (.IGS) and/or the like. The computer model further includes information about the geometry and/or other defining properties of the mechanical part's structure. The computer model may include a polygon mesh, such as a collection of vertices, edges, and faces, that define the shape of representative part model 108. For example and without limitation, the faces of the polygon mesh may include triangles, such as a triangle mesh, quadrilaterals, or other simple convex polygons.

Still referring to FIG. 1, representative part model 108 may include a plurality of sides. Each side of plurality of sides, as used in this disclosure, may include a view of representative part model 108 from a plane orthogonal to an axis passing through an origin of representative part model 108. The axis may include, as a non-limiting example, a three-axis coordinate system, such as the x-axis, y-axis, and z-axis, or abscissa, ordinate, and applicate. The axis may include, as a further non-limiting example, any axis passing through an origin of the representative part model. Persons skilled in the art, upon reviewing the entirety of this disclosure, will be aware of axis which may be suitable for use as each side of the plurality of sides consistently with this disclosure. The origin of the representative part model, as described herein, is a fixed point of reference for the representative part model 108. For example and without limitation, the origin may include the center of mass, the geometric center, the center of a feature of the part, wherein a feature may be a hole, a well, a groove, a pocket, a channel, extruded volume, and the like. As a further example and without limitation, the origin may include any position of the representative part model. In some embodiments, the representative part model 108 may include physical example of the part to manufactured.

Continuing to refer to FIG. 1, representative part model 108 may include a print 116 which may further include semantic information of the part to be manufactured. A "print" as used herein, is a two-dimensional drawing of a representative part model 108. As used in this disclosure, "two-dimensional" means having, appearing to have, or displaying two out of the three dimensions. Print 116 may include semantic information of part for manufacture 120. Print 116 may include geometric dimensioning and tolerancing (GD&T) information, which may be provided in one or more software files such as DXF files, DWG files, PDF files, and/or the like. As used herein, "geometric dimensioning and tolerancing" is a symbolic language used on engineering drawings and models to define the allowable deviation of feature geometry. GD&T may include feature control frames, as discussed in more detail below. GD&T is based on standards set by the American Society of Mechanical Engineers, ASME Y14.5M-1004 and ASME Y14.41-2003. Print 116 may be received with representative part model 108 or received in a separate transmission and/or from another source. "Semantic information," as described in this disclosure, is data concerning and/or describing product and manufacturing information (PMI) and product life cycle management (PLM). "PMI," as used in this disclosure, is data describing non-geometric attributes of a model of a part for manufacture, such as the computer model of representative part model 108, necessary for manufacturing the part, components of the part, and associated assemblies. For example and without limitation, PMI may include geometric dimensions and tolerancing information (GD&T), 3D annotation and dimensions, surface finish, material specifications, and the like. In some embodiments, PMI may include details about the machinability of the part to be manufactured. PMI may include textual data, such as alphanumeric, punctuation, typographical symbols, character, string data, and/or any textual data as described in the entirety of this disclosure. "PLM," as used in this disclosure, is any data concerning and/or describing management of the lifecycle of the part from inception, through engineering design and manufacture, to service and disposal of the manufactured part. PLM may include textual data, such as alphanumeric, punctuation, typographical symbols, character, string data, and/or any textual data as described in the entirety of this disclosure. In an embodiment, semantic information included in representative part model 108 may be used in processes for pricing a part to be manufactured.

Continuing to refer to FIG. 1, processor 104 is configured to receive a function datum 128 from a user 120 to minimize correlation ambiguity of the representative part model 108. A user 120 may include any persons such as a mechanical designer, mechanical engineer, or the like. A user 120 may use the apparatus 100 to communicate the specifications and intended interpretation of the representative part model 108. As used herein, "correlation ambiguity" is the ambiguity in the translation of the design from function to specification. For example, correlation ambiguity may quantify how well the user 120 succeeded in translating the functional requirement into the specification. If there is good correlation between a functional requirement and a specification, then the correlation ambiguity is low. As used herein, "function" refers to the mechanical functionality of the representative part model 108. For example, a user 120 may indicate the function of a hole is to hold a bearing. This function would indicate that the hole feature needs to have a strict inner diameter to tightly hold the bearing in place. In order to resolve correlation ambiguity, apparatus 100 is configured to use function datum 128. "Function datum", as used in this disclosure, is a user input used to specify the function and/or usage of the representative part model 108. Correlation ambiguity may also rely on clarifying the manufacturing process of the representative part model 108. In an embodiment, the type of manufacturing process may affect the correlation ambiguity of a part. For example, a part that requires strict dimensioning may use machining instead of additive manufacturing because machining allows for stricter tolerancing. Function datum 128 may be received by user input on a graphical user interface (GUI) of a user device 112 communicatively connected to processor 104. Function datum 128 may be shown to a user 120 as a list, wherein the user 120 may select a function out of the list of functions. User 120 may determine the manufacturing process. A machine learning module 200 may determine a manufacturing process as a function of the function datum 128.

Continuing to reference FIG. 1, a list of functions may be determined by a machine learning module 200. In an embodiment, minimizing correlation ambiguity may be achieved as a function of the function datum 128 and a machine learning process. A machine learning module 200, discussed in further detail in FIG. 2, may use a machine-learning model. A "machine-learning model," as used in this disclosure, is a mathematical and/or algorithmic representation of a relationship between inputs and outputs, as generated using any machine-learning process including without limitation any process as described above and stored in memory; an input is submitted to a machine learning module 200 once created, which generates an output based on the relationship that was derived. Machine learning module 200 may be training using training data to determine a function for the representative part model 108. In an embodiment, training data may be made up of a plurality of training examples that each include examples of data to be inputted into the machine learning module 200, such as existing representative part model 108, semantic information of the representative part model 108, etc., and examples of data to be output therefrom, such as data sets that include functions, manufacturing process etc. Training data may be implemented in any manner discussed below. Training data may be obtained from and/or in the form of previous function-part model categorization. Each function of the list of functions may be linked to functional requirements, such that the function datum 128 also includes functional requirements. A "functional requirement" is a requirement for manufacturing the representative part model that is associated with a function. In an embodiment, a functional requirement may include a specific tolerance a manufactured part must meet due to the function of the part. For example, a female and male part must have tight tolerancing in order to mate to each other. Functions and functional requirements may be stored in a database 124 within processor 104. Functional requirements may also be user 120 inputted. Functional requirements may have been predetermined by a user 120 and stored in a database 124 linked to a function. Functional requirements may also be derived from assembly data. Assembly of part includes multiple steps such as pumping water, propelling the part by wheel, sealing gas in a container within a pressure vessel, releasing and closing the gas flow by valves, and/or the like. In the design process, the functionalities of the machines are reduced to functionality of each part of the machines, for instance holding bearing, sealing gas, sliding interface of armature, and the like. From the assembly, interrelation between parts, such as mating, sliding, contacting, sealing, interfacing force and coupling may be defined. From the parts interfacing information, the GD&T specifications may be inferred. Training data may include the assembly data and the function of the machine and the GD&T on each part. For instance specification of cylindricity on cylindrical hole may be determined by interaction of tolerance of piston in cylinder and the hole. Training data for the machine learning module 200 may also be stored in a database 124.

Continuing to refer to FIG. 1, database 124 may be implemented, without limitation, as a relational database, a key-value retrieval datastore such as a NOSQL database, or any other format or structure for use as a datastore that a person skilled in the art would recognize as suitable upon review of the entirety of this disclosure. Dataset may be stored in any suitable data and/or data type. For instance and without limitation, dataset may include textual data, such as numerical, character, and/or string data. Textual data may include a standardized name and/or code for in-process and/or post-processing manufacturing, or the like; codes may include raw material codes, dimensional codes, calibration codes, mechanical and/or thermal testing codes, safety codes, and/or data formatting codes, which may include without limitation codes used in CAD 3D geometry, assembly and PMI standards such as STEP AP242, ASME Y14.5 geometric dimensioning and tolerancing (GD&T) symbols, ASME Y14.41 digital product definition data practices, ASME Y14.100 Engineering Drawing Practices, ASME Y14.36 Surface Texture Symbols and ASME B46-I surface texture In general, there is no limitation on forms textual data or non-textual data used as dataset may take; persons skilled in the art, upon reviewing the entirety of this disclosure, will be aware of various forms which may be suitable for use as dataset consistently with this disclosure.

Still referring to FIG. 1, processor 104 may be configured to extract a semantic datum 128 from the representative part model 108 and/or print 116. As used in this disclosure, "semantic datum" is an element of data describing and/or identifying semantic information is and/or from a print 116 of a reference part model. Semantic datum 128 may include geometric dimensions and tolerances such as geometric tolerance, annotation and dimensions, surface roughness, surface finish, material specifications, PMI, PLM, and the like of a representative part model 108. As used in this disclosure, a "geometric tolerance" is a quantified limit of allowable error of one or more physical attributes of a representative part model 108. Semantic datum 128 may include a form tolerance such as straightness, flatness, circularity, and/or cylindricity; a profile tolerance such as profile of a line and/or profile of a surface; an orientation tolerance such as angularity, perpendicularity, and/or parallelism; location tolerance such as position, concentricity and/or symmetry; a runout tolerance such as circular runout and/or total runout; and the like. Semantic datum 128 may be calculated using information from representative part model 108 and/or print 116. Semantic datum 128 may be an input from a user 120. Semantic datum 128 may be included in the print 116 as symbols, annotations, numerical values, text, embedded information, and/or the like. As used in this disclosure, "text" includes letters, numbers, and/or symbols. Print 116 may include an image representing representative part model 108 or a component of the representative part model 108, a number representing a numerical tolerance of the component, and/or an indicator that identifies the numerical tolerance is associated with the component. Print 116 may also indicate a unit of measurement and/or a scale, which may be included in semantic datum 128 or on which semantic datum 128 may be based. For example, print 116 may state that the dimensions are in inches, list the scale as "2:1", include a circle representing an exterior cylindrical surface of part for manufacture 120, and have an arrow pointing from "R0.5000+/−0.0003" to the circle. Processor 104 may be configured to recognize "+/−" as a symbol representing a tolerance for the preceding number in the amount of the succeeding number. Processor 104 may also be configured to identify the arrow and that it is point from the numbers to the circle and determined that the tolerance is for the circle, specifically the radius of the circle. Processor 104 may be configured to identify the unit of measurement stated in print 116 and determine that the radius tolerance for the circle is +/−0.0003 inches. Processor 104 may also be configured to identify measurement scale and adjust numbers, including semantic datum 128, accordingly. Processor 104 may be configured to determine scale by comparing an annotation of measurement to an actual length in print 116. In some embodiments, processor 104 may recognize encoding in a file of print 116 as representing semantic datum 128 and may extract semantic datum 128 from the file.

Continuing to reference FIG. 1, processor 104 of apparatus 100 is configured to verify the intended interpretation of the representative part model 108 as a function of a specification datum 140. "Intended interpretation", as used herein, refers to the interpretation of the semantics datum 144. Often times, a representative part model 108 and the semantics datum 144 associated with the representative part model 108 and print 116 may have specification ambiguity. "Specification ambiguity", as used in this disclosure, refers to ambiguities in the semantics of the representative part model 108. In an embodiment, specifications may be written in a way that allows for several reasonable interpretations. Agreement or consensus of parties, such as supplier and user 120, may be included in resolving the specification ambiguity. Usage and interpretation of GD&T symbols may vary. Prior implicit consensus between parties throughout the past relationship may also form consensus. Processor 104 may propose multiple interpretations of the specification, such as multiple interpretations of representative part model 108 and/or print 116, with corresponding prices to user 120, which may resolve the specification ambiguity. From past agreements, machine learning module 200 may infer the implicit consensus of the specifications. And the propose the most probable interpretations up front and alternates as the user disagree the proposed interpretations. Apparatus 100 is configured to verify the intended interpretation of the specification. The intended interpretation of the specification may be stored as a specification datum 140. "Specification datum", as used herein, is an element of data describing the specifications of a model. In a nonlimiting example, specification datum 140 may include intended interpretations of the PMI such as GD&T. In an embodiment, apparatus 100 may verify that the user 120 used their intended control symbols (within GD&T). Specification datum 140 may include a single interpretation of the representative part model 108. For example, specification datum 140 may include the feature control frame. A "feature control frame" is a notion to add controls to the drawing, wherein the controls are GD&T controls that specify tolerancing, form, profile, orientation, location, and runout. "Form" as used herein, specifies the shape of a feature, such as straightness, flatness, etc. "Profile", as used herein, describes the three-dimensional tolerance zone around a surface. "Orientation", as used herein, concerns dimensions that vary at angles, such as parallelism, perpendicularity, and angularity. "Location", as used herein, defines a features location using linear dimensions, such as concentricity, symmetry, etc. "Runout", as used herein, defines the amount by which a particular feature can vary.

Still referencing FIG. 1, verifying the intended interpretation of the representative part model 108 may further include verifying as a function of user input and a machine learning module 200. A user 120 may input a specification datum 140. User 120 may select an intended interpretation of a plurality of interpretations of the representative part model 108. A plurality of interpretations may be generated through a machine learning module 200. Similar to the machine learning module 200 used to determine function datum 128, this machine learning module 200 may also take training data of previous representative part models and their associated interpretations, and output interpretations of the representative part model 108 in question. The machine learning model may contain inputs which may include shapes, symbols, annotations, text, embedded information, and/or the like that contain semantic information, such as GD&T, as discussed above and may include the associated measurements and components of representative part model 108. The output of the machine learning model may be a plurality of interpretations of the model. Training data may contain outputs which may include specification datum 140. Training data may be collected by recording from prints 116 the shapes, symbols, annotations, text, embedded information, and/or the like that contain semantic information and the corresponding interpretations that were extracted from them. Training data may be collected from prior agreements with and/or interpretations of specifications from users 120. For example, machine learning module 200 may be trained by training data correlating semantic information, such as GD&T, in representative part models 108 and/or prints 116 and the corresponding interpretations of the semantic information and/or previous agreements to resolve specification ambiguity by a specific user 120. Machine learning module 200 may then be configured to output an interpretation of semantic information from user device 112 of a specific user 120 based on the training data including interpretations and/or previous agreements to resolve specification ambiguity by the specific user 120 and an input of the semantic information. Training data may be stored in a database 124.

With continued reference to FIG. 1, processor 104 maybe configure to determine machinability datum 132 from the representative part model 108 as a function of semantic datum 144, function datum 128, and specification datum 140. As used in this disclosure, "machinability datum" is an element of data describing and/or identifying the machinability of a representative part model 108. "Machinability" as used in the current disclosure is the ease with which a work material can be cut (machined) permitting the removal of the material. In an embodiment, machinability datum 132 may be evaluation of if the representative part model 108 can be consistently manufactured to a given standard. In a non-limiting example, a machinability datum 132 may be a Boolean value, a score, or a single datum value for the part for manufacture. Additionally, machinability datum 132 may be a list of geometric features depicted in the model, each of which receives a machinability datum 132. Machinability datum 132 could be a vector or table of values linked to and/or corresponding to features. Machinability datum 132 may be a based on a consideration of the level of difficulty it would take to machine the given part and keep all its features within the given tolerance range. Machinability datum 132 may also be a consideration of the amount of force it would take to machine the parts without causing deflection of the part in the fixturing system. Both deflection of tool and part may deteriorate accuracy of the part and result in failure of fulfilling the specification. In other embodiments, machinability datum 132 may encompass a consideration if a part can be machined as a function of a set of tools that are required to complete. Machinability datum 132 may be determined as a function of semantic datum 128. A person skilled in the would understand that in a general sense, parts with lower tolerances will be less machinable than parts with larger tolerances.

With continued reference to FIG. 1, machinability datum 132 may encompass two sets of factors: the condition of work materials and the physical properties of work materials. As used in the current disclosure, "work materials" are the raw materials that the part is machined out of. The condition of the work material is determined by eight factors: microstructure, grain size, heat treatment, chemical composition, fabrication, hardness, yield strength, and tensile strength. Physical properties are those of the individual material groups, such as the modulus of elasticity, thermal conductivity, thermal expansion, and work hardening. Machinability datum 132 may be based on operating conditions, cutting tool material and geometry, and the machining process parameters.

With continued reference to FIG. 1, processor 104 may determine machinability datum 132 from the representative part model 108 using several methods. Processor 104 may be configured to decide which method to use as a function for the work materials and the configuration of the part that is being created. Methods of determining machinability datum 132 may include several methods such as the tool life method, tool forces and power consumption method, surface finish method, the Taylor tool life equation, and the machinability rating method. A person of ordinary skill in the art would know that there is no widely accepted consensus method of determining machinability. With that in mind, accurately determining the machinability of different parts and materials may require any method or combination of methods mentioned herein above.

With continued reference to FIG. 1, machinability datum 132 may be determined as a function of semantic datum 128, function datum 128, and specification datum 140. Machinability datum 132 and semantic datum 128 may have a relationship that the tighter or lower semantic datum 128 is for a part for manufacture, that part will require more process control. This relationship may be especially true with extremely low tolerances that are more difficult to attain. Machinability datum 132 may factor in function datum 128 in for the processes required to machine a part. Machinability datum 132 may factor in specification datum 140 to understand the correct interpretation of the GD&T and/or semantics datum 144 of the representation part model. Semantic datum 128 may influence the quality and cost of a part. Tight or low tolerance machining is typically more expensive because, usually the parts must be machined more slowly and often with more expensive tools. Both time and cost to manufacture a part may directly influence machinability datum 132. Parts with a tighter semantic datum 128 also require more extensive quality CNC inspection, since the window of error is much smaller this may also contribute machinability datum 132 by making a part less machinable. Another factor that can influence machinability datum 132 when dealing with tight tolerance machining is the high reject rate, which tends to be higher. This higher reject rate may also influence machinability datum 132. Tighter tolerances reflected in semantic datum 128 and specification datum 140 may increase production costs and quality inspection costs which also makes difficult to machine the part.

With continued reference to FIG. 1, processor 104 may be configured to generate machinability datum 132 as an output using a machine-learning process. Machinability training data may correlate inputs and outputs, whereas inputs may include semantic datum 128, the time and cost to manufacture a part, the type of equipment that is required to manufacture a part, cutting forces and power consumption, surface finishing, the tool wear, tool breakage, process monitoring system and/or the machinability rating method. Outputs are machinability data 132. Machinability training data is a plurality of data entries containing a plurality of inputs that are correlated to a plurality of outputs for training a processor by a machine-learning process to extract machinability datum 132. Machinability training data may contain information about workpiece materials including material type, microstructure, grain size, heat treatment, chemical composition, fabrication, hardness, yield strength, and tensile strength, heat transfer coefficient, frictional constant, fracture toughness, modulus of elasticity, thermal conductivity, thermal expansion coefficient, and work hardening, frictional constant, and/or the like. In other embodiments, Machinability training data may include machinability data 132 from previous machine learning models. Machinability training data may include any machinability datum 132 stored in database 124 or a user input. Machinability training date may be used to trained machine-learning model using a machine-learning process to correlate inputs and outputs. Machine-learning model may output machinability datum 132 by using a machine-learning process, as a function of machinability training data and one or more inputs discussed above.

With continued reference to FIG. 1, processor 104 may be configured to determine the manufacturability of a part as a function of machinability datum 132. As used in the current disclosure, "manufacturability" is the ease at which a product can be manufactured or produced on a large scale. In an embodiment, manufacturability may be calculated directly using machinability datum 132 because, the ease at which a part can machined directly relates to a parts manufacturability. Generally, the less machinable a part is the less manufacturable a part is. In some embodiments, manufacturability may be determined as a function of cost and time machine each part. The cost to manufacture a part may be driven by time, so the design must minimize the time required to not just machine (remove the material), but also the set-up time of the CNC machine, NC programming, fixturing and many other activities that are dependent on the complexity and size of the part. Additionally, a significant contributing factor to the cost of a machined component is the geometric tolerance to which the features must be made. The tighter the tolerance required, the more expensive the component will be to machine. The tolerance may require processes other than machining such as EDM (Electrical discharge machining), graining, polishing and chemical etching. When designing, specify the loosest tolerance that will serve the satisfactory mechanical functionality of the component with the minimum cost. Tolerances must be specified on a feature-by-feature basis. When the tolerances are loose enough or undefined, the surfaces may be left as casted, forged or 3D printed. Often undefined surfaces are defined outside of the specification, which may be the result of consensus of supplier and user 120. Usage and interpretation of GD&T symbols may be implicit consensus between the parties throughout the relationship and prior machining of parts. Processor 104 may be configured to resolve correlation ambiguity by proposing multiple interpretations of the specification to user 120 with corresponding prices for each interpretation, from which the user 120 may select an interpretation of the specification. By proposing multiple interpretations of the specification with the corresponding price quotes to user device 120, the most plausible interpretation referencing to the past orders, the ambiguity may be resolved. The corresponding price quotes may be determined by any process described in this disclosure. There are creative ways to engineer components with loose tolerances that still perform as well as ones with tighter tolerances. In other embodiments, manufacturability may be determined as a function of workpiece materials. The most manufacturable types of metals generally include aluminum, brass, and softer metals. As materials get harder, and stronger, such as steel, stainless steel, titanium, and high strength alloys, they become much harder to machine and take much longer, thus being less manufacturable. Most types of plastic are easy to machine, although additions of fiberglass or carbon fiber can reduce the machinability. Plastics that are particularly soft, yet they have machinability problems of fracturing and melting in the cut.

With continued reference to FIG. 1, processor 104 may be configured to identify unmachinable qualities of the part. As used in the current disclosure, "unmachinable qualities" is any quality of the part to be manufactured causes the part to be determined as unmachinable. In a non-limiting example, qualities that make a part unmachinable may include workpiece material deteriorations, tolerances, geometric features for the part to be manufactured, surface roughness, time, cost, a set of tools, fixturing system, tool accessibility, set-up and load time for the part to be manufactured, machinability datum 132, manufacturability, and the like. If the given quality for a part is outside a predetermined range for any of these considerations the part may be considered unmachinable. The unmachinable qualities of the part may be displayed within the manufacturing quote 136 or on the user device 112.

With continued reference to FIG. 1, processor 104 may be configured to identify corrections to the part to improve machinability. Corrections to the part may include suggestions to use a different material that is more machinable. In other embodiments, Corrections may include suggesting a larger tolerance for a particular feature of the part for manufacture 120. Slight changes to the geometry of the features of the part may also be suggested to improve manufacturability. In embodiments. Processor 104 may determine that what correction needs to be made by using a combination of manufacturability, machinability datum 132, semantic datum 128. For example, if a tolerance is too small for a given feature, processor 104 may suggest relaxing that tolerance. In another nonlimiting example, if a part is unmachinable due to its geometry processor 104 may make a suggestion that entails removing or altering that geometrical feature. Processor 104 may be configured to output a plurality of different suggestions to improve machinability of the part for manufacture. Part corrections may be displayed within the manufacturing quote 136 or on the user device 112.

Generating a correction may be consistent with the disclosure of U.S. patent application Ser. No. 15/939,209 filed on Mar. 28, 2018 entitled "METHODS AND SYSTEMS FOR MANUFACTURING A SUPPORT STRUCTURE," and U.S. patent application Ser. No. 17/589,009 filed on Jan. 31, 2022 entitled "METHODS AND SYSTEMS FOR GEOMETRIC ANALYSIS OF A PART FOR MANUFACTURE," both of which are incorporated herein in their entirety by reference.

With continued reference to FIG. 1, processor 104 identify corrections to improve machinability using machine learning. Corrections training data may correlate inputs and outputs. Whereas inputs to the to the machine learning model may include semantic datum 128, machinability datum 132, manufacturability, workpiece material considerations, the time and cost to manufacture a part, the tool set, the type of equipment that is required to manufacture a part. While the output to the machine learning model is corrections to the part. Corrections training data is a plurality of data entries containing a plurality of inputs that are correlated to a plurality of outputs for training a processor by a machine-learning process to make corrections to improve manufacturability for a part. Corrections training data may contain information about workpiece materials including material type, microstructure, grain size, heat treatment, chemical composition, fabrication, hardness, yield strength, and/or tensile strength. Corrections training data may include tolerances, geometric features for the part to be manufactured, time, cost, a set of tools that is required to machine the part, set-up and load time for the part to be manufactured, machinability datum 132, and/or manufacturability. In other embodiments, Corrections training data may include corrections from previous machine learning models. Corrections training data may include any past corrections of the part stored in database 124 or a user input.

With continued reference to FIG. 1, processor 104 may be configured to generate a manufacturing quote 136. As used in the current disclosure, a "manufacturing quote" is a report detailing the dimensions of the part and the manufacturability of the part. Manufacturing quote 136 may include a written description of the part for manufacture 120. Additionally in a non-limiting example, manufacturing quote 136 may include a materials list, time to manufacture, cost to manufacture, equipment used, the dimensions of the finished part, weight of the part, part number, and the like. A manufacturing quote 136 may also include the geometrical tolerances calculated as a function of semantic datum 128 to go with each feature of the part. A manufacturing quote 136 may include a recommendation of which work materials to use to manufacture the part. In some embodiments, a manufacturing quote 136 may include suggested methods of assembly for the part. A manufacturing quote 136 may also include suggestions on the most efficient order of assembly for the part. Additionally, a manufacturing quote 136 may make suggestions on corrections to a unmachinable part in order to make it machinable of manufacturable. These suggestions may include increasing the tolerances for various features, changing the material of the part, and/or altering the part design.

With continued reference to FIG. 1, processor 104 may be configured to generate a manufacturing quote 136 as a function of the machinability datum 132. A manufacturing quote 136 may depict a visual representation of the part for manufacture 120. The machinability datum 132 may be overlayed on top of the visual depiction. Machinability datum 132 may be depicted as an overall score for the part. The machinability datum 132 may also be depicted as a score for each geometric feature of the part. Machinability scores below a predetermined range may depict the unmachinable qualities of the part for manufacture 120. Within the manufacturing quote 136, correction to the unmachinable qualities may be depicted as annotated. Unmachinable qualities may be described in redline drawings to confer proposed revision of the specification and/or the design, which may be depicted with redlines and letter on the original drawing. In some embodiments, the specification and/or the design may be revised if the original specification and/or design cannot be fulfilled, for example, due to manufacturing constraints. Manufacturability may also be depicted in a manufacturing quote 136. Manufacturability may be calculated within manufacturing quote 136 for various quantities of the part.

With continued reference to FIG. 1, processor 104 may be configured to generate a manufacturing quote 136 as a function of semantic datum. The semantic datum 128 may be shown over each individual geometric feature of the representative part model 108 within manufacturing quote 136. Manufacturing quote 136 may have semantic datum 128 displayed within a spreadsheet. The spreadsheet may be annotated depicting semantic datum 128 that makes the part for manufacture unmachinable. Corrections for unmachinable tolerances may also be included within the spreadsheet or the visual depiction.

With continued reference to FIG. 1, manufacturing quote 136 includes a price quote 156 of a representative part model 108. Price quote 156 may be determined with a computer model such as a machine learning module 200. Machine learning module 200 may use quote training data which may include historical pricing data of different representative part models. In some embodiments, processor 104 may use a classifier, to classify different representative part models by their machinability datum 132, including the type of machining needed. A "classifier," as used in this disclosure is a machine-learning model, such as a mathematical model, neural net, or program generated by a machine learning algorithm known as a "classification algorithm" that sorts inputs into categories or bins of data, outputting the categories or bins of data and/or labels associated therewith. A classifier may be configured to output at least a datum that labels or otherwise identifies a set of data that are clustered together, found to be close under a distance metric, or the like. A classifier may be derived from training data. For example, quote training data may be grouped by materials needed, type of machining needed, or the like.

Processor 104 and/or another device may generate a classifier using a classification algorithm, defined as a process whereby a computing device derives a classifier from training data. Classification may be performed using, without limitation, linear classifiers such as without limitation logistic regression and/or I Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, processor 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may be configured to generate classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database 124, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number I of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

More disclosure related to generating quotes may be found in U.S. Nonprovisional application Ser. No. 14/060,033 filed on Oct. 22, 2013, and entitled, "AUTOMATED FABRICATION PRICE QUOTING AND FABRICATION ORDERING FOR COMPUTER-MODELED STRUCTURES", which claims the benefit of priority of U.S. Provisional Patent Application Ser. No. 61/717,185, filed on Oct. 23, 2012, and titled "SYSTEM AND METHOD FOR GENERATING QUOTES AND ORDERING PARTS," which is incorporated by reference herein in its entirety.

Figure 4:
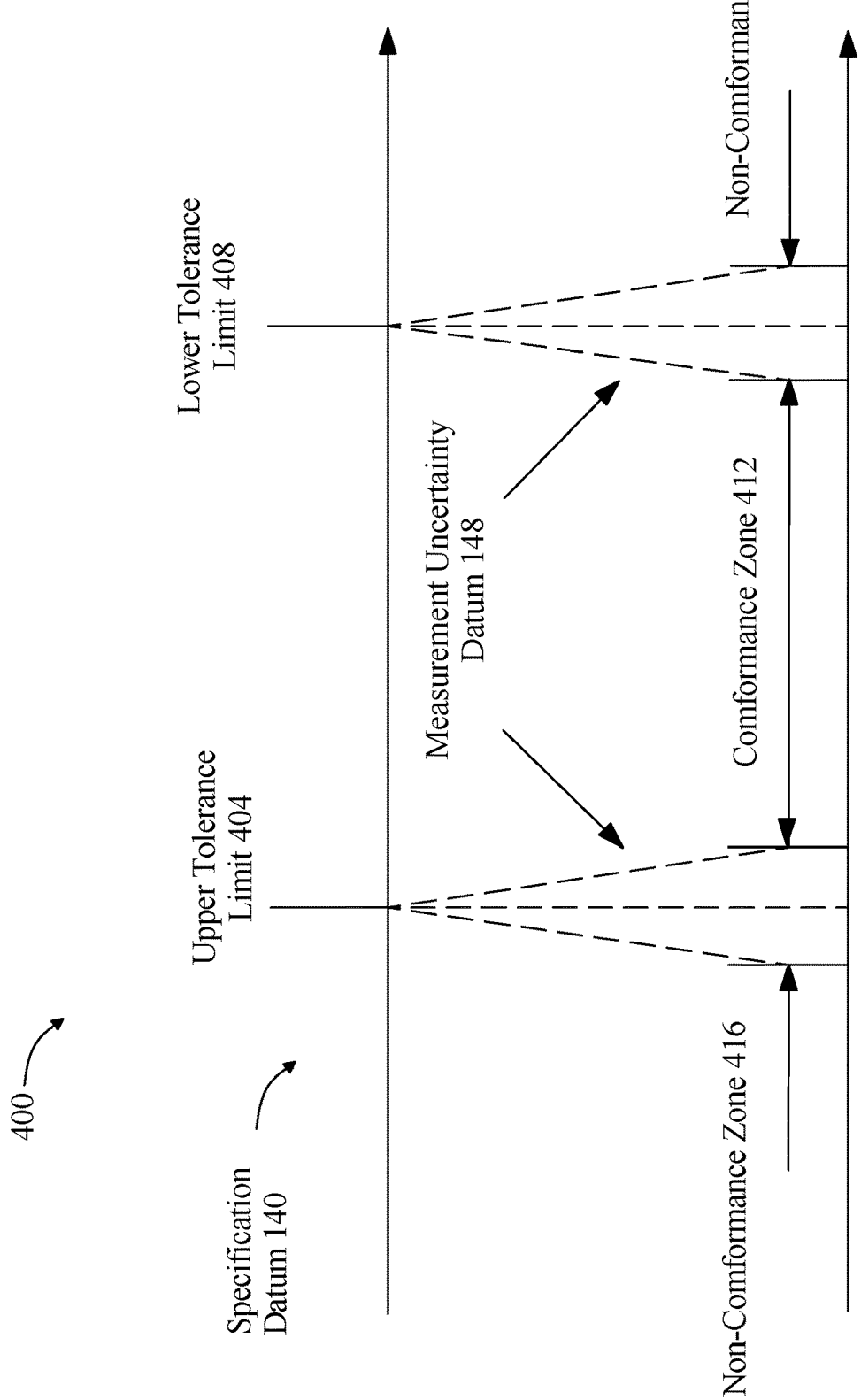
FIG. 4 is an embodiment of a quality assurance report.

Still referring to FIG. 1, processor 104 is configured to determine a measurement uncertainty datum 148 as a function of the specification datum 140. As used herein, "measurement uncertainty" is the uncertainty that arises due to different measurement equipment. Measurement equipment, such as a ruler, caliper, scale, or the like, each have their own uncertainties which may cause disagreements between two parties. In an embodiment, the two parties may be a purchaser of a part and a supplier of a part. "Measurement uncertainty datum", as used herein, is a set of data that serves as a range that qualifies a manufactured part as being in conformance with the specification datum 140. Because different measurement equipment may have different uncertainties, measurement uncertainty datum 148 may serve as a range a user 120 may measure within to verify conformance. "Conformance", as used herein, is compliance with the specification datum 140, which includes the GD&T tolerances. FIG. 4 shows an example of conformance to a specification datum 140 with respects to the measurement uncertainty datum 148.

Continuing to refer to FIG. 1, apparatus 100 may generate a quality assurance report. Quality assurance report may include a description of the representative part model 108 measurements as a function of the specification datum 140 and the measurement uncertainty datum 148. Measurement uncertainty datum 148 may be defined by a user input into a user device 112. For example, a user 120 may input that they want the supplier measurements to fall within $\frac{1}{10}^{th}$ of the tolerance specified in the specification datum 140. In another nonlimiting example, measurement uncertainty datum 148 may be defined by ISO 14253-1. Quality assurance report may be generated to include all the datums generated through apparatus 100 such as the function datum 128, the specification datum 140, the measurement uncertainty datum 148, and the like. Quality assurance report may be generated to include any methods of how the manufactured part may be measured. Quality assurance report may be generated to ensure that the user 120 is satisfied with the interpretation and measuring of a representative part model 108 submitted by the user 120. In an embodiment, a user 120 may choose to fix a specification in the specification datum 140, or a function datum 128 of a portion of the representative part model 108. In this case, processor 104 may retrain the machine learning module 200 to include the inputs from the user 120, and output a new model to be used in the quality assurance report.

Figure 2:
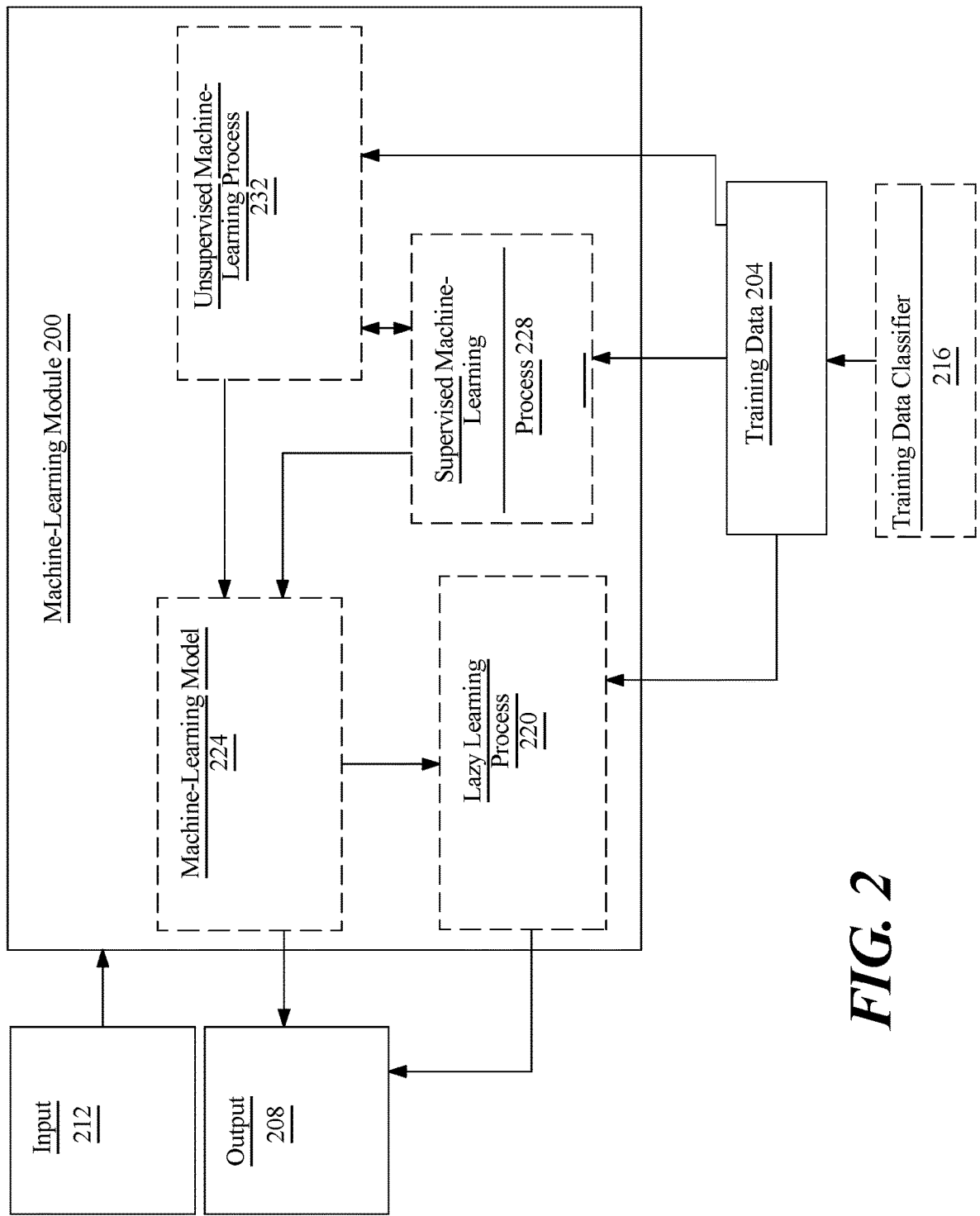
FIG. 2 illustrates a block diagram of an embodiment of a machine-learning module.

Referring now to FIG. 2, an exemplary embodiment of a machine learning module 200 200 that may perform one or more machine-learning processes as described in this disclosure is illustrated. Machine learning module 200 may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user 120 and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a process whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs described in this disclosure as inputs, outputs described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
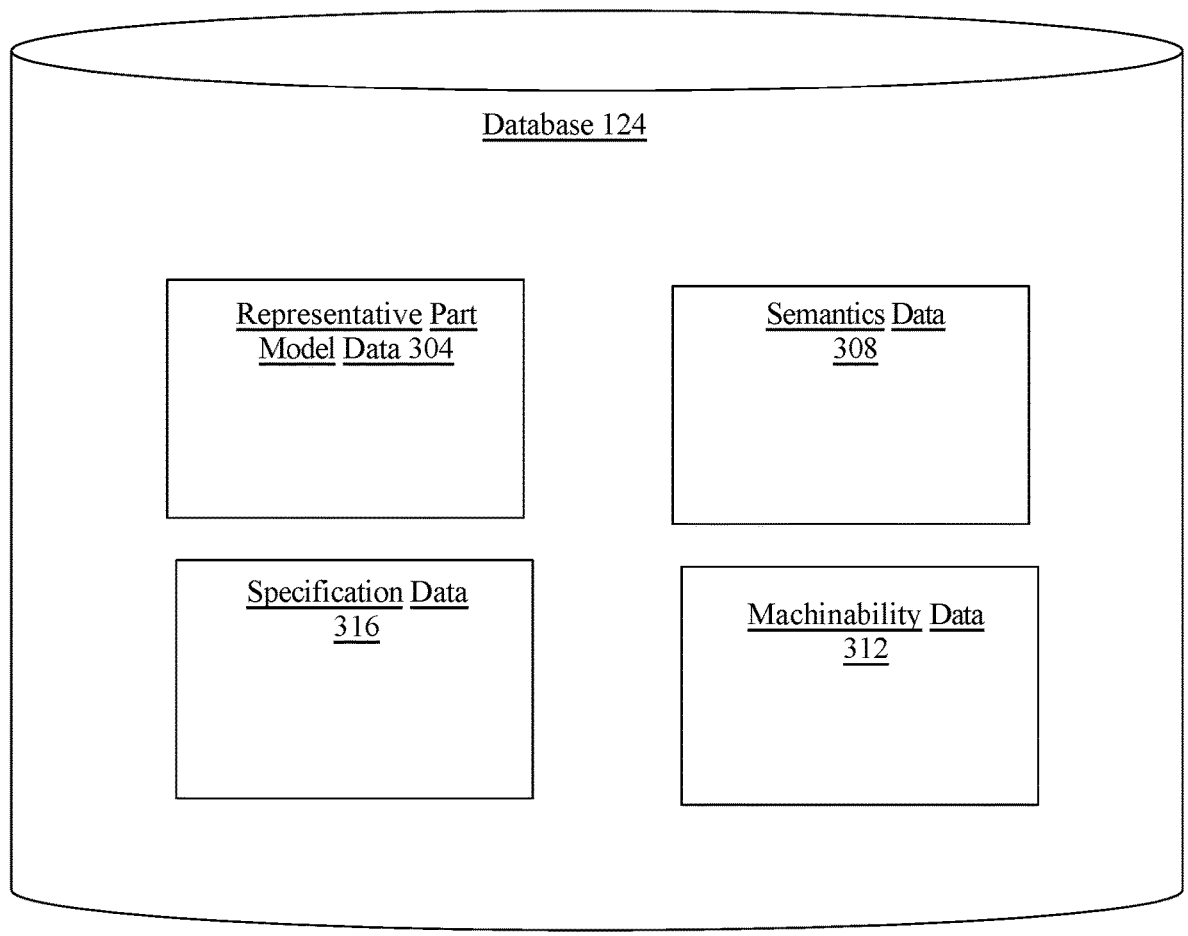
FIG. 3 is a block diagram illustrating an embodiment of an internal database.

Referring now to FIG. 3, an embodiment of database 124 is illustrated. Database 124 may be implemented as a hardware and/or software module. Database 124 may be implemented, without limitation, as a relational database, a key-value retrieval datastore such as a NOSQL database, or any other format or structure for use as a datastore that a person skilled in the art would recognize as suitable upon review of the entirety of this disclosure. database 124 may contain datasets that may be utilized by unsupervised machine-learning model 200 to find trends, cohorts, and shared datasets between data contained within database 124 and representative part model 108. In an embodiment, datasets contained within database 124 may be categorized and/or organized according to shared characteristics. For instance and without limitation, one or more tables contained within database 124 may include representative part model data 304. Database 124 may store semantics data 308, specification data 316 found in specification datum 140, machinability data 312, and any other data discussed in this disclosure.

Referring now to FIG. 4, an embodiment of an excerpt of a quality assurance report 400. Quality assurance report 400 may show the specification datum 140, which in this case is the tolerance. Quality assurance report 400 may show the upper tolerance limit 404 and the lower tolerance limit 408, which may be derived from the specification datum 140 and semantics datum 144. Quality assurance report may show the measurement uncertainty datum 148 of the tolerance. Measurement uncertainty datum 148 may include the range of which a measurement may fall in between. Quality assurance report may show a conformance zone 412 that is acceptable for measurement to fall within. Quality assurance report may show a non-conformance zone 416, which is a zone outside the measurement uncertainty datum range.

Referring now to FIG. 5, a method 500 of an interactive compliant manufacturing process. Step 505 of method 500 includes receiving, from a user 120, a representative part model 108 of a part for manufacture, wherein the representative part model 108 includes a computer model of the part for manufacture. Representative part model may be consistent with any representative part model disclosed as part of this disclosure. Processor may receive the representative part model 108 from a user 120 device 112. Step 510 includes receiving, from a user 120, a function datum 128 to minimize correlation ambiguity of the representative part model 108. Function datum 128 may be a data set that specifies the function of the representative part model 108. Function datum 128 may minimize correlation ambiguity because the usage of a part may drive a manufacturing process or semantics datum 144. Function datum may be consistent with any function datum disclosed as part of this disclosure. Step 515 includes verifying, by processor, the intended interpretation of the representative part model 108 as a function of a specification datum 140. Specification datum 140 may include one interpretation of the semantics datum 144. Specification datum may be consistent with any specification datum disclosed as part of this disclosure. Interpretation of the semantics datum 144 may be user identified. Step 520 includes, analyzing, by processor, price quotes of the representative part model 108. Price quotes may be determined as a function of the semantics datum 144, function datum 128, and specification datum 140. Step 525 includes, determining, by processor, a measurement uncertainty datum 148 as a function of the function datum and the specification datum 140. Measurement uncertainty datum may be consistent with any measurement uncertainty datum disclosed as part of this disclosure. Measurement uncertainty may arise after the representative part model 108 is manufactured. The manufactured part may have a measurement uncertainty due to the nature of different measurement devices. Measurement uncertainty datum 148 may be clarified by a user 120.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
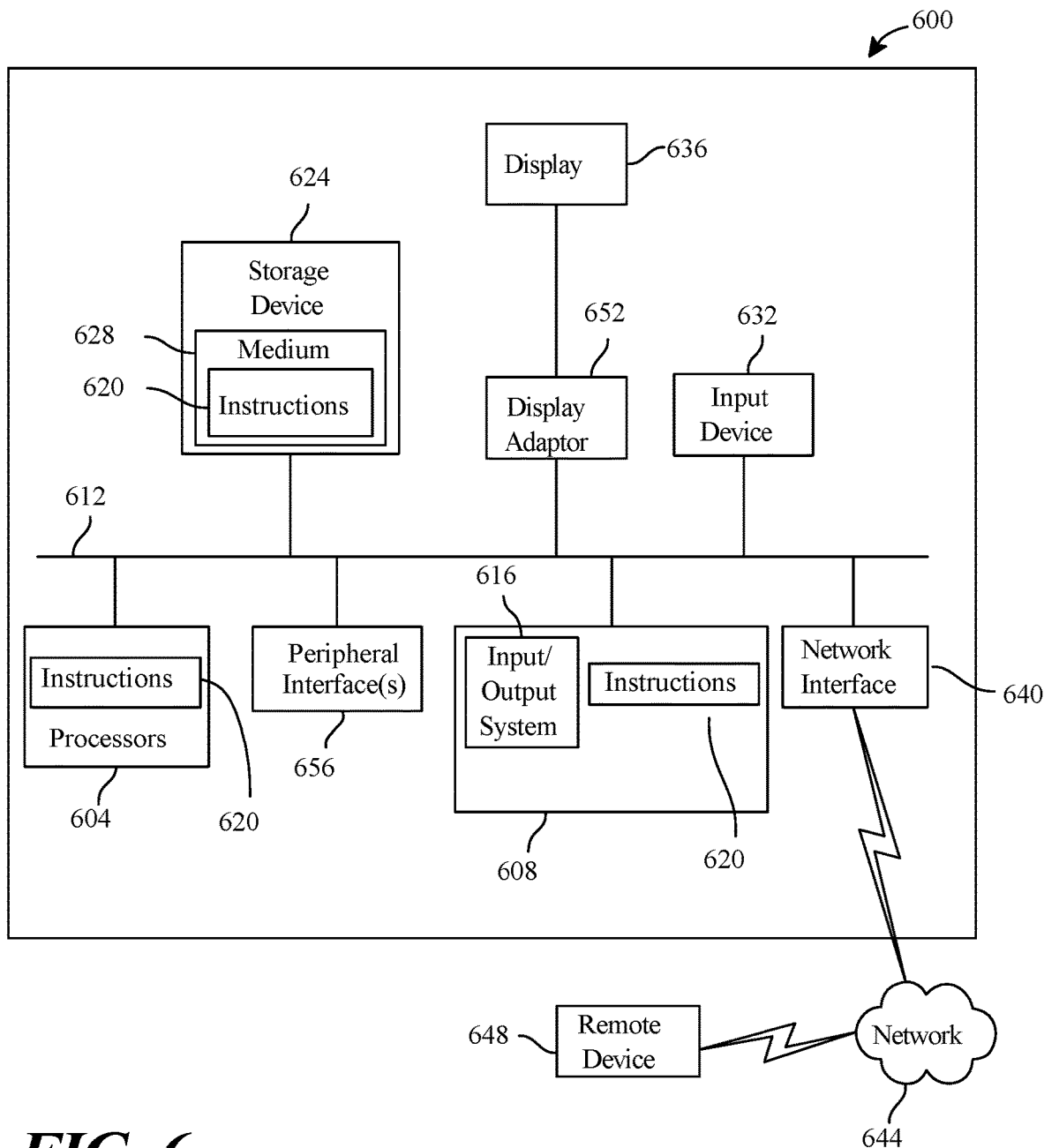
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for an interactive compliant manufacturing process, wherein the apparatus comprises:
a processor; and
a memory communicatively connected to the processor, the memory containing instructions configuring the processor to:
receive a representative part model of a part for manufacture, wherein the representative part model comprises a computer model of the part for manufacture;
receive a function datum from a user to minimize correlation ambiguity of the representative part model, wherein the function datum is associated with at least one of a function of the representative part model and a type of manufacturing process and wherein correlation ambiguity is associated with translation of design from function to specification;
verify an intended interpretation of the representative part model as a function of a specification datum;
analyze a price quote of the representative part model; and
determine a measurement uncertainty datum as a function of the specification datum;
wherein minimizing correlation ambiguity further comprises minimizing correlation ambiguity as a function of the function datum and a machine learning process;
wherein verifying the intended interpretation of the representative part model further comprises verifying as a function of user input and a machine learning module; and
wherein analyzing price quotes of the representative part model further comprises analyzing price quotes of the representative part model as a function of a machine learning process to determine a manufacturing process.

2. The apparatus of claim 1, wherein the computer model comprises a 3D model of the part.

3. The apparatus of claim 1, wherein the function datum further comprises functional requirements of the representative part model.

4. The apparatus of claim 1, wherein the specification datum further comprises a single interpretation of the representative part model.

5. The apparatus of claim 1, wherein analyzing price quotes as a function of a machine learning process further comprises presenting alternative models.

6. The apparatus of claim 1, wherein the processor is further configured to generate a quality assurance report; wherein the quality assurance report comprises at least one of an upper tolerance limit and a lower tolerance limit.

7. The apparatus of claim 6, wherein the quality assurance report further comprises a description of the representative part model measurements as a function of the specification datum and the measurement uncertainty datum.

8. A method for an interactive compliant manufacturing process, wherein the method comprises:
receiving, from a user, a representative part model of a part for manufacture, wherein the representative part model comprises a computer model of the part for manufacture;
receiving, from a user, a function datum to minimize correlation ambiguity of the representative part model wherein the function datum is associated with at least one of a function of the representative part model and a type of manufacturing process and wherein correlation ambiguity is associated with translation of design from function to specification;
verifying, by processor, an intended interpretation of the representative part model as a function of a specification datum;
analyzing, by processor, a price quote of the representative part model; and determining, by processor, a measurement uncertainty datum as a function of the function datum and the specification datum;

wherein minimizing correlation ambiguity further comprises minimizing correlation ambiguity as a function of the function datum and a machine learning process;

wherein verifying the intended interpretation of the representative part model further comprises verifying as a function of user input and a machine learning module; and wherein analyzing price quotes of the representative part model further comprises analyzing price quotes of the representative part model as a function of a machine learning process to determine a manufacturing process.

9. The method of claim 8, wherein the computer model comprises a 3D model of the part.

10. The method of claim 8, wherein the function datum further comprises functional requirements of the representative part model.

11. The method of claim 8, wherein the specification datum further comprises a single interpretation of the representative part model.

12. The method of claim 8, wherein analyzing price quotes as a function of a machine learning process further comprises presenting alternative models.

13. The method of claim 8, further comprising generating a quality assurance report: wherein the quality assurance report comprises at least one of an upper tolerance limit and a lower tolerance limit.

14. The method of claim 13, wherein the quality assurance report further comprises a description of the representative part model measurements as a function of the specification datum and the measurement uncertainty datum.

* * * * *